3,254,054
POLYESTER PRODUCTION USING A GUANIDINE
CATALYST
Jan A. K. Boerma, Rozendaal, Gelderland, Netherlands, assignor, by mesne assignments, to American Enka Corporation, Enka, N.C., a corporation of Delaware
No Drawing. Filed Feb. 23, 1962, Ser. No. 175,302
Claims priority, application Netherlands, Mar. 10, 1961, 262,267
4 Claims. (Cl. 260—75)

This invention relates generally to a process for preparing polyesters and more particularly to a process for preparing polymeric polymethylene terephthalate using an improved catalyst.

It is well known that polyterephthalates may be prepared by heating esters of terephthalic acid with glycols having the formula:

$$HO(CH_2)_nOH$$

where $n$ is a number between 2 and 10. Esters of terephthalic acid that may be used in this process are, for example, the aliphatic, cyclo aliphatic or aromatic esters. In particular, the lower alkyl esters of terephthalic acid such as dimethyl terephthalate may be used.

The preparation of polyterephthalates generally involves two stages, the first being an ester-interchange between the terephthalic acid ester and the glycol, and the second being polycondensation of the resultant bis(hydroxyalkyl)-terephthalate.

In order to accelerate the ester-interchange, various catalysts have been employed. Likewise, the polycondensation reaction has also been promoted using a variety of catalysts. Those ester-interchange catalysts that have been found satisfactory, for example, are zinc acetate, magnesium oxide, or calcium oxide. Satisfactory polycondensation catalysts are lead oxide or antimony oxide. While all of the above-mentioned catalysts are effective in promoting ester-interchange or polycondensation, respectively, they have serious drawbacks in that their presence in the polymeric polymethylene terephthalate product causes a high degree of thermal degradation of such polymer when it is exposed to high temperatures as in the melt spinning process.

Accordingly, it is an object of this invention to provide a process for preparing polymeric polymethylene terephthalates which have improved properties over polymeric polymethylene terephthalates produced by the prior art processes.

Another object of this invention is to provide a process for producing polymeric polymethylene terephthalates which are not subject to thermal degradation when exposed to high temperatures.

A further object of this invention is to provide improved ester-interchange and polycondensation catalysts for use in preparing polymeric polymethylene terephthalates from terephthalic acid esters and glycol.

These and other objects will become apparent from the following detailed description.

In accordance with this invention, polymeric polymethylene terephthalates having low thermal degradation properties are prepared from esters of terephthalic acids and glycols by carrying out at least the ester-interchange in the presence of a guanidine catalyst, one or more hydrogen atoms of which has been substituted by an alkyl group containing not more than 8 carbon atoms.

There are known processes for preparing polymeric polymethylene terephthalates the products of which can be heated at high temperatures with only a small degree of thermal degradation. In these processes, the ester-interchange is carried out in the presence of various organic bases as catalysts.

The advantage of the process of this invention over the aforementioned processes is that the use of an alkyl-substituted guanidine catalyst causes the ester-interchange to proceed more rapidly. Thus, it is possible for the ester-interchange to be effected in a shorter time and at a lower temperature which results in the reaction mass being subjected to a lesser degree of degradation with attendant lower content of degradation products. Moreover, when the polymeric polymethylene terephthalate is subsequently processed, a lesser degree of thermal degradation occurs than with the polymers produced by the prior art processes.

Only a small amount of the guanidine catalyst is needed to produce the desired ester-interchange. Generally, an amount not greater than 0.02 mol. catalyst per mol. of terephthalic acid ester is sufficient. Larger amounts may be used. However, no further improvement is obtained in the product. It has been found that the preferred guanidine derivatives are the methyl-substituted guanidines. Of those tetramethyl guanidine has been found to be particularly satisfactory. If a very thermostable polymeric polymethylene terephthalate is desired, the guanidine catalyst should be used in both the ester-interchange and polycondensation reactions exclusive of any other catalyst.

For better understanding of the invention, the following example is given by way of illustration and not limitation. All parts are by weight unless otherwise stated.

*Example*

A mixture of 120 parts dimethyl terephthalate, 111 parts ethylene glycol, and 0.5 part tetramethyl guanidine (i.e., NN (dimethyl) N'N' (dimethyl) guanidine) were heated in a glass container under atmospheric pressure with stirring. The temperature was gradually raised at first to 110° C. with a strong evolution of methanol taking place. As the reaction proceeded, the temperature was gradually raised until after about two hours a temperature of 200° C. had been reached. The ester-interchange stage of the reaction was then completed with the percentage of ester-interchange product amounting to 99.7%.

The ester-interchange product was then transferred into a stainless steel autoclave together with 0.024 part of antimony oxide used as a polycondensation catalyst, and heating was continued at a temperature of 272° C. At the same time the pressure was gradually decreased to 0.1 mm. Hg. After three hours of heating, a polymeric mass was obtained having an intrinsic viscosity of 0.64. The polymer was clear and had a melting point of 258° C. After additional heating for one hours at 282° C., the intrinsic viscosity of the polymer decreased to 0.63. Thermal decomposition of the polymer was very low. Polyester threads produced with the fiber were also clear and thermostable.

As used in the example, intrinsic viscosity is a measure of the degree of polymerization of the polyester and may be defined as: Limit $\eta_{sp.}/c$ (as C approaches zero), where $\eta_{sp.}$ is the viscosity of a dilute phenol-tetrachloroethane solution of the polyester divided by the viscosity of the phenol-tetrachloroethane mixture measured in the same units at the same temperature, and C is the concentration in grams of the polyester per 100 cc. of solution.

Polymeric polymethylene terephthalates prepared in accordance with this invention may be worked up into shaped articles such as threads, fibers and films in the known manner. The properties of these products such as strength and elongation are at least as high as those products produced from polymeric polymethylene terephthalates in which the prior art catalysts were used. Furthermore, products manufactured from polyesters prepared in accordance with this invention are very clear, making them especially advantageous for films.

It will be apparent to those skilled in this art that many different embodiments of this invention may be made without departing from the spirit and scope thereof and therefore it is not intended to be limited except as set forth in the following claims.

What is claimed is:
1. In the process of preparing polyesters from a saturated glycol containing from 2 to 10 carbon atoms and a dialkylester of terephthalic acid by ester interchange in the presence of an ester-interchange catalyst followed by the polymerization of the saturated glycol diester of terephthalic acid by heating at a condensation temperature in the presence of a polymerization catalyst to provide a fiber-forming polymer, the improvement which comprises employing as the ester-interchange catalyst a catalytic amount of a guanidine at least one hydrogen atom of which has been substituted by an alkyl group containing not more than 8 carbon atoms.

2. The process of claim 1 in which the guanidine ester-interchange catalyst is NN (dimethyl) N'N' (dimethyl) guanidine.

3. The process of claim 1 in which the guanidine ester-interchange catalyst is employed in an amount up to 0.02 mol of catalyst per mol of dialkylester of terephthalic acid.

4. The process of claim 1 in which the saturated glycol is ethylene glycol and the dialkylester of terephthalic acid is dimethyl terephthalate.

References Cited by the Examiner

UNITED STATES PATENTS

| | | | |
|---|---|---|---|
| 2,898,369 | 8/1959 | Cain | 260—564 |
| 2,970,986 | 2/1961 | Woodward | 260—475 |
| 3,018,266 | 1/1962 | Lundberg | 260—564 |

FOREIGN PATENTS

| | | |
|---|---|---|
| 312,069 | 8/1930 | Great Britain. |
| 765,597 | 1/1957 | Great Britain. |

OTHER REFERENCES

Elley et al.: "The India Rubber World," December 1, 1926, pages 143 and 144.

WILLIAM H. SHORT, *Primary Examiner.*

L. J. BERCOVITZ, *Examiner.*